Inventor
John Baude
By Warren F.B. Lindsley
Attorney

Inventor
John Baude
by Warren F. B. Lindsley
Attorney 2,927,264

DYNAMICALLY AND STATICALLY CONTROLLED MAGNETIC AMPLIFIERS FOR MULTIPURPOSE RELAY USE

John Baude, Milwaukee, Wis., assignor to Allis-Chalmers Manufacturing Company, Milwaukee, Wis.

Application December 10, 1956, Serial No. 627,161

11 Claims. (Cl. 323—89)

This invention relates to control arrangements for electric devices and more particularly to dynamically and statically controlled magnetic amplifiers for use as multipurpose relays.

Heretofore magnetic amplifier static transfer characteristics have been used for purposes of control signal amplification. Its time constant was kept small in order to make the phase angle between the control signal current variations and the gate current modulation as small as possible.

The magnetic amplifier dynamic characteristics may also be employed for control purposes. In this case, the amplifier is purposely designed with a large time constant. The ratio of the square of the control winding turns to control circuit resistance in such an amplifier is relatively large. Its sensitivity to the usual causes for drift is less than the high speed statically controlled amplifier because its control performance is based primarily upon dynamic power gain. The dynamic control features of the self-excited amplifier are most apparent in the region of low gate current. The influence of supply voltage variation can be minimized by arranging control requirements in such a manner that the important operating range is located in the low gate current region and by proper bias control. In the dynamically controlled amplifier a frequency modulation of time varying voltage of the control signal may be used to obtain the desired gate or control output current modulation. Circuit simplicity, accuracy and versatility are the main features of a dynamically controlled magnetic amplifier.

Some of the factors which must be considered when a dynamically controlled amplifier is used as a control element are as follows:

Sufficient time must be available between the control impulse and the corresponding gate current response;

The ratio of control impulse change with time in frequency and/or amplitude, to the magnetic amplifier's response time must be considered. This ratio is a design factor and determines the frequency range at which gate current modulation is most effectively obtained;

Calibration and performance of the magnetic amplifier must be considered because it is influenced by the wave shape of the control voltage.

For the purposes of control signal comparison, more than one control signal winding may be used and various other control windings may be employed as bias control windings to shift the static transfer characteristic depending upon control signal frequency and/or supply voltage variations.

In accordance with this invention the magnetic amplifier's dynamic characteristics, as well as its static and dynamic combined characteristics, are used for control purposes. The magnetic amplifier comprises a plurality of windings having a first set of windings electrically connected with an electrically controlled device to a source of power. A control circuit comprising a plurality of control circuit current amplifying devices is electrically connected to a second set of windings across a source of variable frequency. The second set of windings affects current flow in the first set of windings to alternately increase and decrease the current flow in the first set of windings and through the electrically controlled device in rhythmic response to the dynamic characteristics of the magnetic amplifier.

It is therefore one object of this invention to provide a new and improved multipurpose relay.

Another object of this invention is to provide a new and improved magnetic amplifier control device.

A further object of this invention is to provide a new and improved multipurpose relay which utilizes the dynamic characteristics of a magnetic amplifier to obtain its control variations.

A still further object of this invention is to provide a new and improved multipurpose relay which utilizes a plurality of windings on a magnetic amplifier for controlling output current modulation of the relay.

Objects and advantages other than those set forth will be apparent from the following description when read in connection with the accompanying drawing in which.

Figure 1:
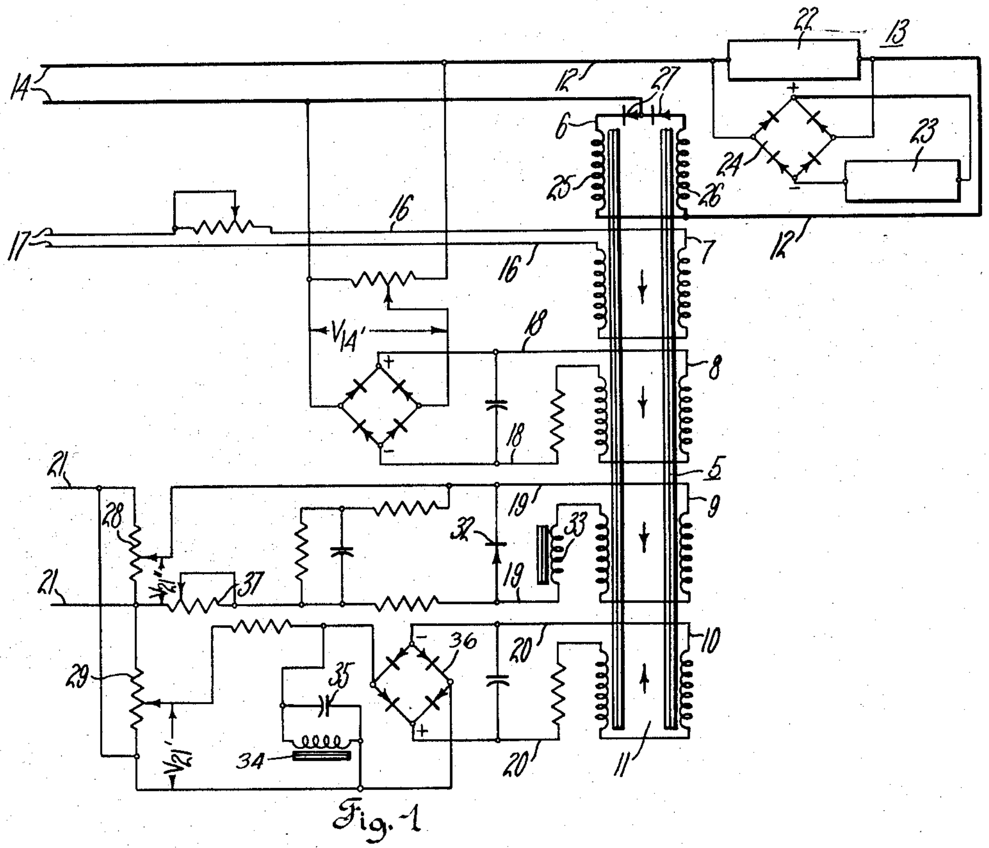
Fig. 1 is a diagrammatic view of a multipurpose relay employing a magnetic amplifier and embodying the present invention.

Referring more particularly to the drawings by characters of reference, Fig. 1 illustrates diagrammatically a magnetic amplifier control circuit diagram comprising in combination a magnetic amplifier 5 comprising a plurality of windings or sets of windings 6, 7, 8, 9 and 10 mounted on a magnetic core 11. Windings 6 are connected in series in a control circuit 12 with an electrically controlled device 13 across a source of commercial electric power 14 such as a sixty cycle system. Windings 7 are connected through a control circuit 16 across a suitable source of control power 17 which may be either direct or alternating current. Windings 8 are connected through a control circuit 18 comprising a plurality of control circuit current amplifying devices across the source of commercial electric power 14. Windings 9 and 10 are each connected through control circuits 19 and 20, respectively, across a source of variable frequency 21. Each of the control circuits 19 and 20 comprise a plurality of control circuit current amplifying devices.

The controlled electric device 13 may comprise either a thermal relay 22 or a magnetic relay 23 or both connected in series with windings 6 across the source of power 14 forming what is generally known as a gate circuit. Relays 22 and 23 have not been shown in detail because they are well known by those skilled in the art. If so desired, relay 23 may be connected across a rectifier 24 which is connected in series with windings 6. As noted from Fig. 1 of the drawings, windings 6 comprise a pair of parallelly arranged winding portions 25 and 26 each connected in series with a rectifier such as a diode 27.

The dynamic characteristics of the magnetic amplifier 5 are emphasized by the control windings 19 and 20 each connected across resistors 28 and 29, respectively. Resistors 28 and 29 are connected in parallel across the source of variable frequency 21. These control circuits through windings 9 and 10 provide gate current variations which are a function of the voltage amplitude and frequency of the source of variable frequency 21. They also affect current flow in the gate circuit 12 to alternately increase and decrease the current flow in the gate circuit in rhythmic response to the dynamic characteristics of the magnetic amplifier and the control circuits 19 and 20.

Control circuit 19 through a rectifier such as diode 32 and the choke coil 33 connected as shown in Fig. 1 provides windings 9 with substantially half cycle unidirectional current pulses in the direction to drive the amplifier's output current down.

The dynamic characteristics of the magnetic amplifier 5 is emphasized by the current amplifying devices forming a part of control circuit 20 energizing the control signal bias winding 10 and more particularly by the resonance circuit thereof formed by inductance 34 and capacitance 35. This resonance circuit may be tuned to a specific frequency to modify, by increasing or decreasing, the average value of the amplifier's control signal bias winding's load current over a certain frequency range of source 21 or at a specific frequency of source 21. It is also possible to change the average value of the gate current through control circuit 12 with reference to the control signal voltage frequency 21 in a manner which will provide contact operation of thermal relay 22 substantially on the basis of integrated control signal cycles or impulses. By means of a rectifier 36 in control circuit 20 windings 10 are provided with unidirectional current pulses over a given range of frequencies of the frequency of source 21.

Control circuit 18 energizing windings 8 is used for biasing purposes and for minimizing the effect of supply voltage variations and for establishing the range of operation of the magnetic amplifier. The arrows shown in Fig. 1 illustrate for each control winding whether that winding is connected to increase or decrease the amplifier output or gate current.

Control circuit 16 energizing windings 7 is used for static control of the magnetic amplifier by means of, for example, D.C. voltage which may be introduced into the magnetic amplifier after the control voltage from the source of variable frequency 21 has disappeared or has changed to a D.C. voltage.

The following winding data for the control windings of a magnetic amplifier used in the control circuit diagram illustrated in Fig. 1 resulted in the curves illustrated in Figs. 2, 3, 4 and 5. Circuit elements identified in Figs. 2–5 are shown in Fig. 1. The magnetic amplifier's characteristics are as follows:

| Windings | Turns | Ohms |
|---|---|---|
| 7 | 30 | .32 |
| 8 | 210 | 46 |
| 9 | 1,050 | 780 |
| 10 | 1,050 | 780 |

Figure 2:
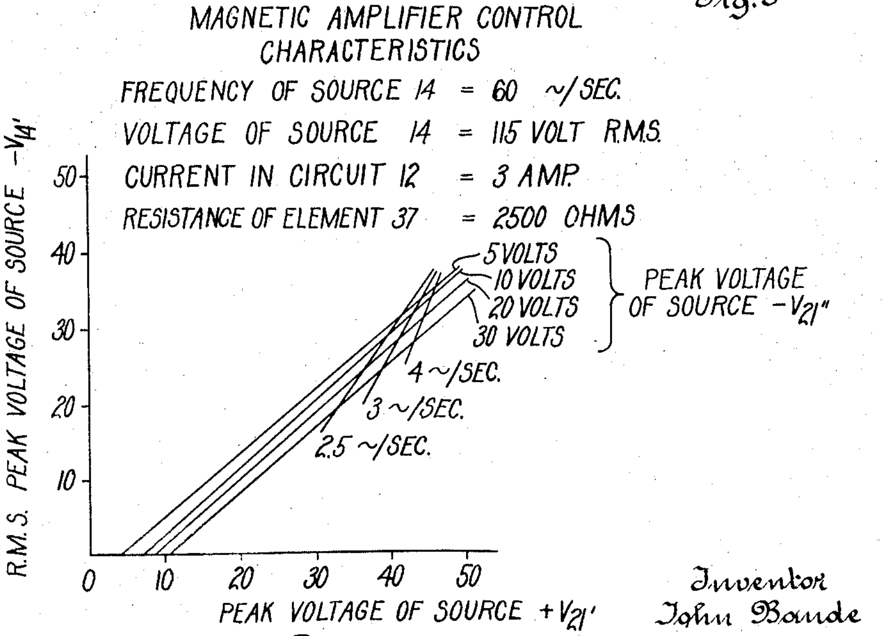
Fig. 2 is a graph illustrating the magnetic amplifier's performance for a given set of circuit characteristics.

The performance of magnetic amplifier 5 and relay 23 is illustrated in Fig. 2 for the circuit elements and voltage values indicated. The straight line characteristics illustrated in Fig. 2 indicate stability which places the amplifier in operating competition with other types of control devices such as magnetic relays, etc. The phase shift between the source of variable frequency 21 and the gate current modulation of circuit 12 is influenced by the magnitude of a resistor 37 forming a part of the control circuit 19. The larger the magnitude of resistor 37 the greater is the overall time delay between the source of variable frequency 21 and the gate current modulation for any given frequency of source 21. Therefore, the curves illustrated in Fig. 2 are representative only for the circuit values indicated. Similar characteristic curves are obtainable for other values of magnitude of resistor 37.

Figure 3:
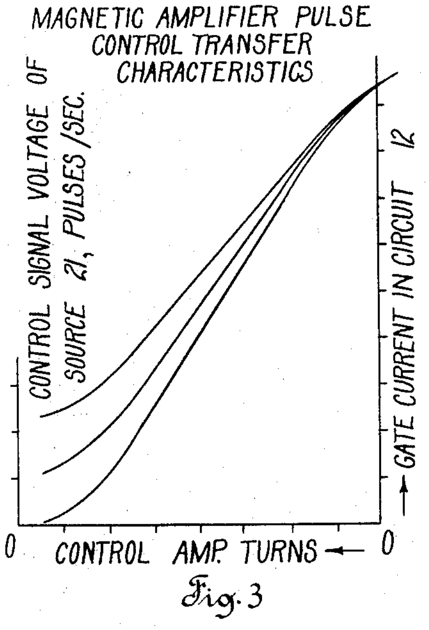
Fig. 3 is a graph illustrating the dynamic response of a magnetic amplifier to a pulsating control signal of varying frequency and intensity.

Fig. 3 illustrates the dynamic response of a magnetic amplifier to a pulsating control signal of varying frequency and intensity. It is apparent that in the critical cutoff region the gate current change is more influenced by the frequency of the control current than by its amplitude.

Figure 4:
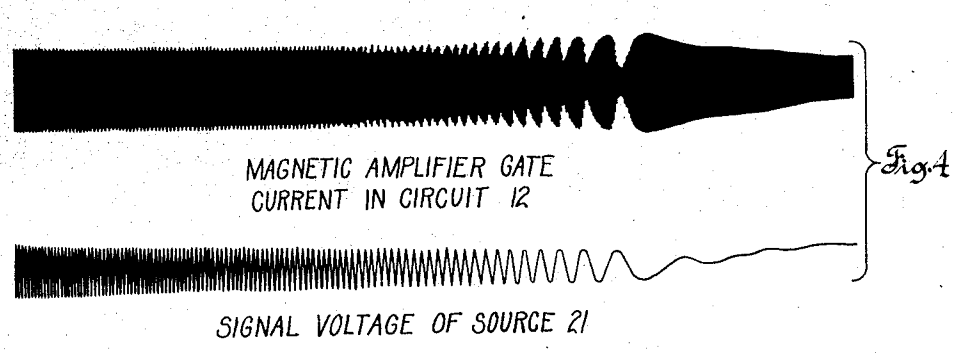
Fig. 4 illustrates an oscillograph record of the gate current modulation of a circuit similar to that illustrated in Fig. 1 with certain elements removed and others disconnected.

Fig. 4 illustrates an oscillograph record of the gate current modulation of a circuit similar to that illustrated in Fig. 1 except that the rectifier or diode 32 was removed, the control windings 7, 8 and 10 disconnected and a full wave control voltage from the source 21 with varying frequency and decreasing amplitude applied to the control winding 9. As the frequency of the control signal approaches zero its amplitude decreases steadily, yet the corresponding gate current modulation amplitude increases as a function of control signal frequency. Inherent sensitivity to control voltage frequency as compared with its amplitude is the key to simplicity and accuracy of this type of dynamic control system. With a diode 32 and a choke coil 33 connected in the control circuit 19 as shown in Fig. 1, modulation of the gate current in the direction of cutoff is accentuated.

Figure 5:
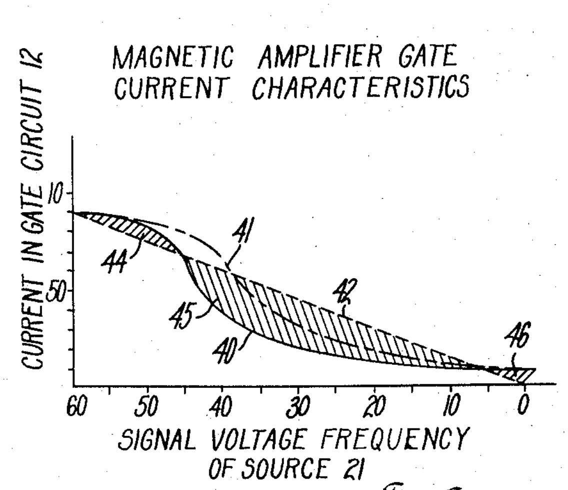
Fig. 5 is a graph illustrating variations of gate current as a function of signal voltage from a variable frequency source.

Fig. 5 illustrates the manner in which the control circuits connected to the magnetic amplifier control windings 9 and 10 can be arranged to provide a gate current variation as a function of signal voltage frequency of source 21. By properly proportioning the voltages across the resistors 28 and 29 and by tuning the resonance circuit formed by inductors 34 and capacitance 35 to the desired control signal frequency, the magnetic amplifier gate current can be controlled in accordance with curves 40 or 41 or practically in a straight line curve 42 as shown in Fig. 5. For special applications, tailor made performance can be obtained by balancing or unbalancing areas 44, 45 and 46 of Fig. 5 depending on the results desired.

It is possible with the help of a magnetic amplifier to greatly extend the function of a simple relay or the combination of different types of relays by arranging various control windings of the amplifier in such a manner that alternately or simultaneously the dynamic as well as the static characteristics of the amplifier are used for purposes of control signal intelligence discrimination.

Although but one embodiment of the present invention has been illustrated and described, it will be apparent to those skilled in the art that various changes and modifications may be made therein without departing from the spirit of the invention or from the scope of the appended claims.

What is claimed is:

1. In combination, an electric device connected to a source of power, a magnetic amplifier comprising first and second sets of windings mounted on a magnetic core, said first set of windings being electrically connected with said electric device to said source of power, and a control circuit comprising a plurality of control circuit current amplifying devices including a resonance circuit, said control circuit being electrically connected to said second set of windings and across a source of variable frequency, said resonance circuit of said second set of windings being tuned to a specific range of frequencies to modify the average value of the current flow in said control circuit as a function of the frequency of said control circuit.

2. In combination, an electric device connected to a source of power, a magnetic amplifier comprising first and second sets of windings mounted on a magnetic core, said first set of windings being electrically connected with said electric device to said source of power, and a control circuit comprising a plurality of control circuit current amplifying devices including a resonance circuit, said control circuit being electrically connected to said second set of windings and across a source of variable frequency, said resonance circuit of said second set of windings being tuned to a specific range of frequencies to modify the average value of the current flow in said control circuit whenever the frequency of said control circuit is different from said specific ranges of frequencies.

3. In combination, an electric device connected to a source of power, a magnetic amplifier comprising first, second, and third sets of windings mounted on a magnetic core, said first set of windings being electrically connected with said electric device to said source of power, a first control circuit comprising a plurality of control circuit current amplifying devices, said first control circuit being electrically connected across a source of variable frequency to said second set of windings for providing said second set of windings with substantially half cycle unidirectional current pulses, and a second control circuit comprising a plurality of control circuit current amplifying devices, said second control circuit being electrically connected across said source of variable frequency for providing said third set of windings with a predetermined degree of control over a range of frequencies of said variable frequency source, said second and third sets of windings affecting current flow in said first set of windings to alternately increase and decrease said current flow in rhythmic response to the dynamic characteristics of said magnetic amplifier and said first and second control circuit.

4. In combination, an electric device connected to a source of power, a magnetic amplifier comprising first, second, and third sets of windings mounted on a magnetic core, said first set of windings being electrically connected with said electric device to said source of power, a first control circuit comprising a plurality of control circuit current amplifying devices, said first control circuit being electrically connected across a source of variable frequency to said second set of windings for providing said second set of windings with substantially half cycle unidirectional current pulses, and a second control circuit comprising a plurality of control circuit current amplifying devices, said second control circuit being electrically connected across said source of variable frequency for providing said third set of windings with substantially unidirectional current pulses, said second set of windings affecting current flow in said first set of windings to alternately increase and decrease said current flow in rhythmic response to the dynamic characteristics of said magnetic amplifier and said first control circuit, said third set of windings affecting current flow in said first set of windings to modify the average value of the current flow in said first set of windings as a function of the frequency of said third control circuit.

5. In combination, an electric device connected to a source of power, a magnetic amplifier comprising first, second, and third sets of windings mounted on a magnetic core, said first set of windings being electrically connected with said electric device to said source of power, a first control circuit comprising a plurality of control circuit current amplifying devices, said first control circuit being electrically connected across a source of variable frequency to said second set of windings for providing said second set of windings with substantially half cycle unidirectional current pulses, and a second control circuit comprising a plurality of control circuit current amplifying devices, said second control circuit being electrically connected across said source of variable frequency for providing said third set of windings with substantially half cycle unidirectional current pulses, said second set of windings affecting current flow in said first set of windings to alternately increase and decrease said current flow in rhythmic response to the dynamic characteristics of said magnetic amplifier and said first control circuit, said third set of windings affecting current flow in said first set of windings to modify the average value of the current flow in said first set of windings as a function of the frequency of said third control circuit.

6. In combination, an electric device connected to a source of power, a magnetic amplifier comprising first, second and third sets of windings mounted on a magnetic core, said first set of windings being electrically connected with said electric device to said source of power, a first control circuit comprising a plurality of control circuit current amplifying devices, said first control circuit being electrically connected across a source of variable frequency to said second set of windings for providing said second set of windings with substantially half cycle unidirectional current pulses, and a second control circuit comprising a plurality of control circuit current amplifying devices including a resonance circuit, said second control circuit being electrically connected across said source of variable frequency for providing said third set of windings with a predetermined degree of control over a range of frequencies of said variable frequency source, said resonance circuit of said third set of windings being tuned to a specific range of frequencies to modify the average value of the current flow in said second control circuit whenever the frequency of said second control circuit is different from said specific range of frequencies, said second and third sets of windings affecting current flow in said first set of windings to alternately increase and decrease said current flow in rhythmic response to the dynamic characteristics of said magnetic amplifier and said first and second control circuits.

7. In combination, an electric device connected to a source of power, a magnetic amplifier comprising first, second, and third sets of windings mounted on a magnetic core, said first set of windings being electrically connected with said electric device to said source of power, a first control circuit comprising a plurality of control circuit current amplifying devices, said first control circuit being electrically connected across a source of variable frequency to said second set of windings for providing said second set of windings with substantially half cycle unidirectional current pulses, and a second control circuit comprising a plurality of control circuit current amplifying devices including a resonance circuit, said second control circuit being electrically connected across said source of variable frequency for providing said third set of windings with substantially half cycle unidirectional current pulses and with a predetermined degree of control over a range of frequencies of said variable frequency source, said resonance circuit of said third set of windings being tuned to a specific range of frequencies to modify the average value of the current flow in said second control circuit whenever the frequency of said second control circuit is different from said specific range of frequencies, said second set of windings affecting current flow in said first set of windings to alternately increase and decrease said current flow in rhythmic response to the dynamic characteristics of said magnetic amplifier and said first and second control circuit, said third set of windings affecting current flow in said first set of winding to modify the average value of the current flow in said first set of windings as a function of the frequency of said third control circuit.

8. In combination, an electric device connected to a first source of power, a magnetic amplifier comprising first, second, third and fourth sets of windings mounted on a magnetic core, said first set of windings being electrically connected with said electric device to said source of power, a first control circuit comprising a plurality of control circuit current amplifying devices, said first control circuit being electrically connected across a source of variable frequency to said second set of windings for providing said second set of windings with substantially half cycle unidirectional current pulses, and a second control circuit comprising a plurality of control circuit current amplifying devices, said second control circuit being electrically connected across said source of variable frequency for providing said third set of windings with substantially unidirectional current pulses, said second set of windings affecting current flow in said first set of windings to alternately increase and decrease said current flow in rhythmic response to the dynamic characteristics of said magnetic amplifier and said first control circuit, said fourth set of windings being connected with a third control circuit across a second source of electric power, said third control circuit comprising a plurality of control circuit current amplifying device for establishing the range of operation of said magnetic amplifier.

9. In combination, an electric device connected to a source of power, a magnetic amplifier comprising first, second, third and fourth sets of windings mounted on a magnetic core, said first set of windings being electrically connected with said electric device to said source of power, a first control circuit comprising a plurality of control circuit current amplifying devices, said first control circuit being electrically connected across a source of variable frequency to said second set of windings for providing said second set of windings with substantially half cycle unidirectional current pulses, and a second control circuit comprising a plurality of control circuit current amplifying devices including a resonance circuit, said second control circuit being electrically connected across said source of variable frequency for providing said third set of windings with a predetermined degree of control over a range of frequencies of said variable frequency source, said resonance circuit of said third set of windings being tuned to a specific range of frequencies to modify the average value of the current flow in said second control circuit wherever the frequency of said second circuit is different from said specific range of frequencies, said second and third sets of windings affecting current flow in said first set of windings to alternately increase and decrease said current flow in rhythmic response to the dynamic characteristics of said magnetic amplifier and said first and second control circuits, said fourth set of windings being connected with a third control circuit across another source of electric power, said third control circuit establishing the range of operation of said magnetic amplifier.

10. In combination, an electric device connected to a first source of power, a magnetic amplifier comprising first, second, third and fourth sets of windings mounted on a magnetic core, said first set of windings being electrically connected with said electric device to said source of power, a first control circuit comprising a plurality of control circuit current amplifying devices, said first control circuit being electrically connected across a source of variable frequency to said second set of windings for providing said second set of windings with substantially half cycle unidirectional current pulses, a second control circuit comprising a plurality of control circuit current amplifying devices, said second control circuit being electrically connected across said source of variable frequency for providing said third set of windings with substantially unidirectional current pulses, said second set of windings affecting current flow in said first set of windings to alternately increase and decrease said current flow in rhythmic response to the dynamic characteristics of said magnetic amplifier and said first control circuit, a third control circuit connected across a second source of electric power, said fourth set of windings being connected with said third control circuit across said second source of electric power, said third control circuit establishing the range of operation of said magnetic amplifier, and a fourth control circuit connected across said first source of power and comprising a plurality of control circuit current amplifying devices for providing static control of said electric device after the period of dynamic and static control of said electric device by said amplifier has elapsed.

11. In combination, an electric device connected to a first source of power, a magnetic amplifier comprising first, second, third, fourth and fifth sets of windings mounted on a magnetic core, said first set of windings being electrically connected with said electric device to said source of power, a first control circuit comprising a plurality of control circuit current amplifying devices, said first control circuit being electrically connected across a source of variable frequency to said second set of windings for providing said second set of windings with substantially half cycle unidirectional current pulses, a second control circuit comprising a plurality of control circuit current amplifying devices including a resonance circuit, said second control circuit being electrically connected across said source of variable frequency for providing said third set of windings with a predetermined degree of control over a range of frequencies of said variable frequency source, said resonance circuit of said third set of windings being tuned to a specific range of frequencies to modify the average value of the current flow in said second control circuit wherever the frequency of said second circuit is different from said specific range of frequencies, said second and third sets of windings affecting current flow in said first set of windings to alternately increase and decrease said current flow in rhythmic response to the dynamic characteristics of said magnetic amplifier and said first and second control circuits, a third control circuit connected across a second source of electric power, said fourth set of windings being connected with said third control circuit across said second source of electric power, said third control circuit establishing the range of operation of said magnetic amplifier, and a fourth control circuit connected across said first source of power and comprising a plurality of control circuit current amplifying devices for providing static control of said electric device after the period of dynamic and static control of said electric device by said amplifier has elapsed, said fourth control circuit being connected to said fifth set of windings.

References Cited in the file of this patent

UNITED STATES PATENTS

| | | |
|---|---|---|
| 2,780,772 | Lee | Feb. 5, 1957 |
| 2,790,127 | Hamilton | Apr. 23, 1957 |
| 2,792,507 | Eckert | May 14, 1957 |